US012212096B2

(12) United States Patent
Kuo

(10) Patent No.: US 12,212,096 B2
(45) Date of Patent: Jan. 28, 2025

(54) CONNECTOR PLUG, ABUTTING STRUCTURE OF THE SAME, AND ELECTRICAL CONNECTION MECHANISM HAVING THE SAME

(71) Applicant: GETAC TECHNOLOGY CORPORATION, New Taipei (TW)

(72) Inventor: Hsiu-Yu Kuo, Taipei (TW)

(73) Assignee: Getac Technology Corporation, New Taipei (TW)

(*) Notice: Subject to any disclaimer, the term of this patent is extended or adjusted under 35 U.S.C. 154(b) by 358 days.

(21) Appl. No.: 17/874,177

(22) Filed: Jul. 26, 2022

(65) Prior Publication Data

US 2023/0032566 A1 Feb. 2, 2023

Related U.S. Application Data

(60) Provisional application No. 63/226,543, filed on Jul. 28, 2021.

(51) Int. Cl.

| | |
|---|---|
| ***H01R 13/62*** | (2006.01) |
| ***H01R 13/502*** | (2006.01) |
| ***H01R 13/506*** | (2006.01) |
| ***H01R 13/627*** | (2006.01) |

(52) U.S. Cl.
CPC ..... *H01R 13/6273* (2013.01); *H01R 13/5025* (2013.01); *H01R 13/506* (2013.01)

(58) Field of Classification Search
CPC .............. H01R 13/6273; H01R 13/506; H01R 13/5025
USPC ......................................... 439/353, 358, 357
See application file for complete search history.

(56) References Cited

U.S. PATENT DOCUMENTS

| | | | | |
|---|---|---|---|---|
| 4,872,736 | A | 10/1989 | Myers et al. | |
| 4,880,393 | A | 11/1989 | Moji | |
| 7,175,465 | B1 | 2/2007 | Tsai | |
| 7,467,965 | B1 * | 12/2008 | Arai | H01R 13/6273 439/353 |
| 7,577,936 | B2 * | 8/2009 | Koseki | G06F 40/126 717/136 |
| 7,677,936 | B2 * | 3/2010 | Sato | H01R 13/506 439/892 |
| 7,758,370 | B1 | 7/2010 | Flaherty | |
| 7,857,651 | B2 | 12/2010 | Chen | |

(Continued)

FOREIGN PATENT DOCUMENTS

| | | |
|---|---|---|
| CN | 107394520 A | 11/2017 |
| CN | 2080245870 U | 11/2018 |

*Primary Examiner* — Phuong K Dinh
(74) *Attorney, Agent, or Firm* — Cooper Legal Group, LLC

(57) ABSTRACT

A connector plug, abutting structure of the same, and electrical connection mechanism having the same are provided. The connector plug includes a connection body and an outer casing member. The outer casing member is disposed outside the connection body and includes an inner casing and an outer casing enclosing the inner casing. At least one engaging arm is disposed on the inner casing and has a pressing portion protruding from the outer casing and an engaging portion extending forward from the pressing portion and hanging on the sidewall of an insertion port of the connection body. At least one engaging hole is defined on a receptacle. When a plug is plugged into the receptacle, the engaging portion becomes engaged with the engaging hole to achieve connection.

20 Claims, 5 Drawing Sheets

(56) References Cited

U.S. PATENT DOCUMENTS

| | | | | |
|---|---|---|---|---|
| 8,087,954 | B2 | 1/2012 | Fuchs | |
| 8,807,489 | B2 * | 8/2014 | Su | H02G 15/007<br>439/447 |
| 8,876,543 | B2 * | 11/2014 | Oka | H01R 13/4223<br>439/353 |
| 10,833,444 | B2 * | 11/2020 | Maesoba | H01R 13/502 |
| 2009/0068904 | A1 | 3/2009 | Sato et al. | |
| 2020/0076128 | A1 | 3/2020 | Yoshida et al. | |
| 2020/0274278 | A1 | 8/2020 | Kameyama et al. | |

* cited by examiner

CONNECTOR PLUG, ABUTTING STRUCTURE OF THE SAME, AND ELECTRICAL CONNECTION MECHANISM HAVING THE SAME

The application claims priority to U.S. Provisional Application No. 63/226,543, filed on Jul. 28, 2021, the disclosure of which is hereby incorporated by reference herein in its entirety.

BACKGROUND OF THE INVENTION

Field of the Invention

The present disclosure relates to connectors and, more particularly, to a connector plug, an abutting structure of a connector plug, and an electrical connection mechanism having a connector plug.

Description of the Prior Art

To prevent glitches, such as a loosened connector otherwise required for signal or data transmission, conventional industrial computers applicable to vehicles or operating in compliance with special standards or military standards, usually come with a specially-designed connector plugging structure, albeit limiting the scope of their application because of an eclectic mix of specifications.

Universal specification, such as USB Type-C specification, is conveniently available to conventional connectors but render it difficult to alter the plugging structures of the conventional connectors for use with the industrial computers in accordance with their stringent usage requirements. In view of this, the present disclosure provides an external reinforcement structure conducive to the application of connectors with universal specification to the aforesaid scenarios which have stringent usage requirements.

The present disclosure is further designed to ensure the abutting firmness of connectors.

SUMMARY OF THE INVENTION

It is an objective of the present disclosure to provide a connector plug, an abutting structure of a connector plug, and an electrical connection mechanism having a connector plug, all adapted to achieve structural reinforcement of connector casings while keeping their universal specification intact, and characterized by an engagement design whereby an abutting structure can be firmly fastened in place in the course of plugging, so as to prevent detachment of connectors in the course of male-female plugging.

Another objective of the present disclosure is to provide a connector plug, an abutting structure of a connector plug, and an electrical connection mechanism having a connector plug, which comply with universal specification, such as USB Type-C specification.

In order to achieve the above and other objectives, the present disclosure provides a connector plug, comprising a connection body and an outer casing member. The connection body has a connector and a terminal member extending to a terminal end of the connector. The terminal member comprises a cable electrically connected to the connector and a sheath portion enclosing the cable. The outer casing member comprises an inner casing and an outer casing enclosing the inner casing. The inner casing fits to the sheath portion from outside. A circular sidewall at a front end of the inner casing defines an insertion port. The insertion port protrudes from a front end of the outer casing when the connector protrudes from a front end of the sheath portion and reaches an interior of the insertion port. At least one engaging arm is disposed on the inner casing and has a pressing portion protruding from the outer casing and an engaging portion extending forward from the pressing portion and hanging above a sidewall of the insertion port.

In order to achieve the above and other objectives, the present disclosure provides an abutting structure of a connector plug, comprising a plug and a receptacle. The plug comprises a connection body and an outer casing member disposed outside the connection body. The outer casing member further comprises an inner casing and an outer casing enclosing the inner casing. A circular sidewall at a front end of the inner casing defines an insertion port. At least one engaging arm is disposed on the inner casing and has a pressing portion protruding from the outer casing and an engaging portion protruding forward from the pressing portion and hanging above the sidewall of the insertion port. The receptacle comprises an abutting body and an abutting outer casing. The abutting outer casing has an insertion opening. The sidewall of the inner casing is inserted into the insertion opening, and the abutting body reaches the interior of the insertion opening, wherein the abutting outer casing has at least one engaging hole. The abutting outer casing has at least one engaging hole. The engaging portion becomes engaged with the engaging hole as the connection body is inserted into the abutting body.

In order to achieve the above and other objectives, the present disclosure provides an electrical connection mechanism having a connector plug and comprising a cable and a plug. The plug is disposed at one end of the cable and comprises a connection body electrically connected to the cable and an outer casing member disposed outside the connection body. The outer casing member comprises an inner casing and an outer casing enclosing the inner casing. A circular sidewall at a front end of the inner casing defines an insertion port. At least one engaging arm is disposed on the inner casing and has a pressing portion protruding from the outer casing and an engaging portion extending forward from the pressing portion and hanging above the sidewall of the insertion port.

DETAILED DESCRIPTION OF THE EMBODIMENTS

Technical features of the present disclosure are depicted by accompanying drawings and described below. However, the accompanying drawings are illustrative rather than restrictive of the present disclosure.

Figure 1:
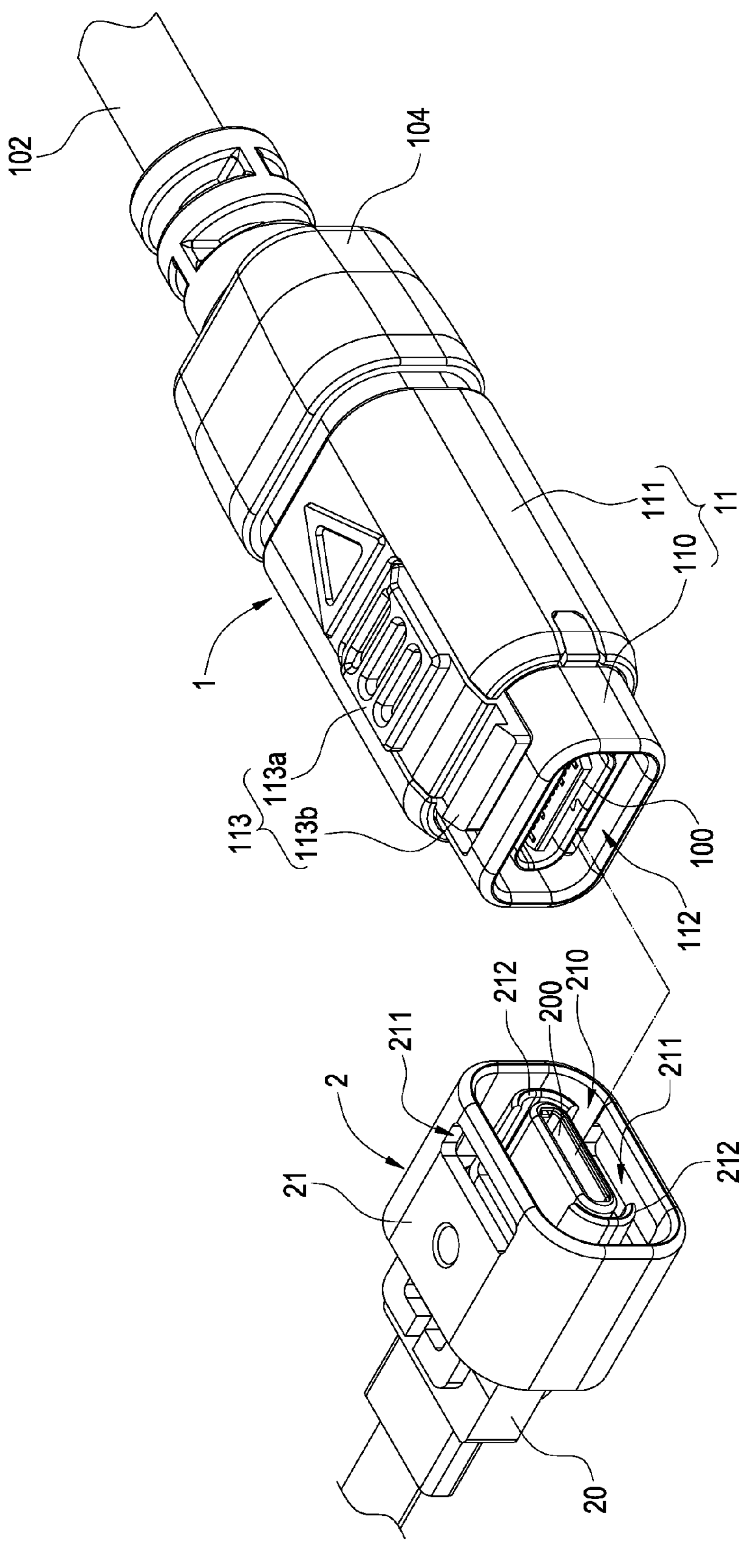
FIG. 1 is an exploded view of a plug and a receptacle of the present disclosure.
Figure 2:
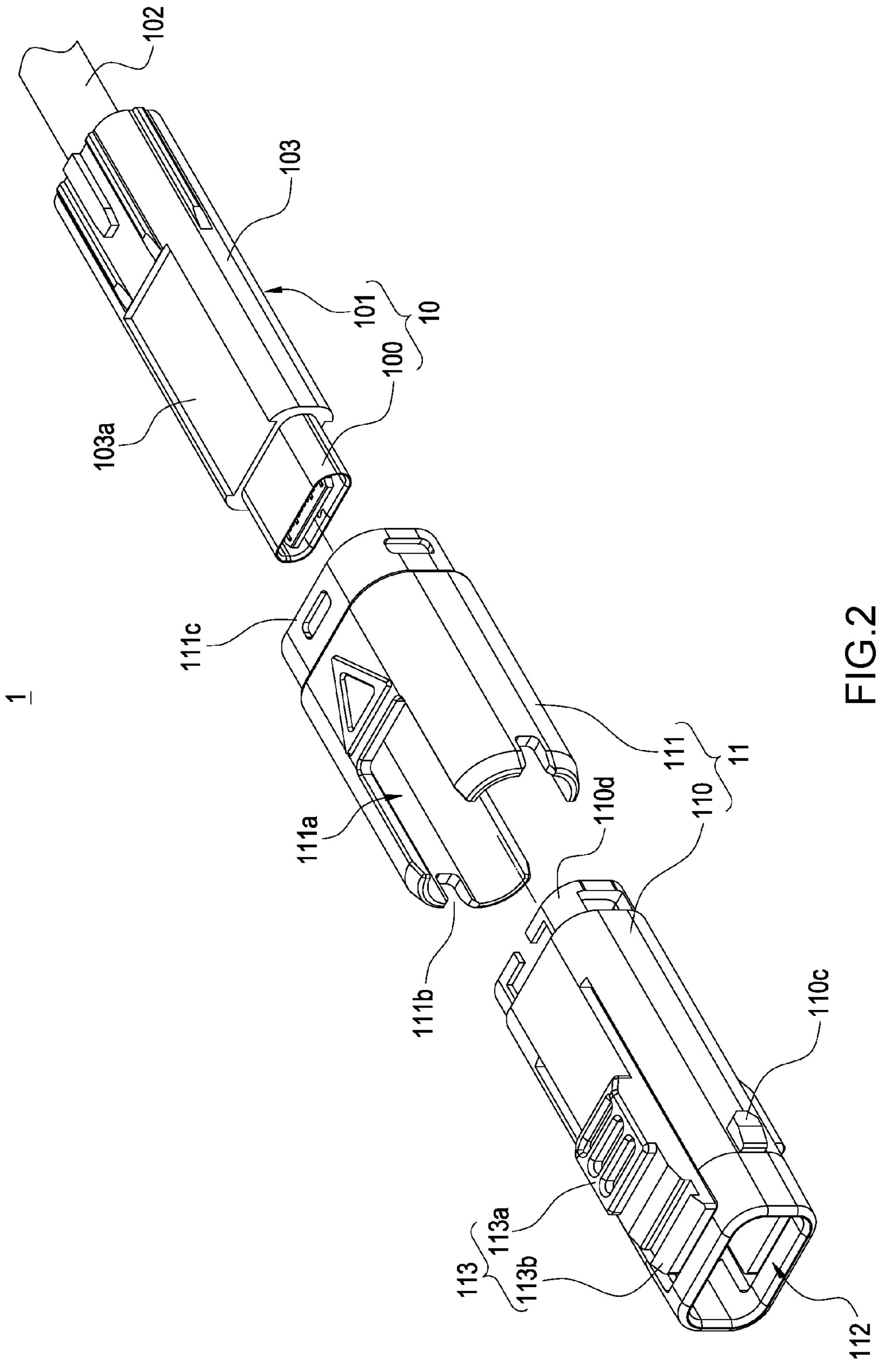
FIG. 2 is an exploded view of the plug of the present disclosure.

Referring to FIG. 1, there is shown an exploded view of a plug and a receptacle of the present disclosure. The present disclosure provides a connector plug, an abutting structure of the same, and an electrical connection mechanism having the same. A connector plug 1 is plugged into a receptacle 2. Referring to FIG. 2, the connector plug 1 comprises a connection body 10 and an outer casing member 11 disposed outside the connection body 10.

The connection body 10 has a connector 100 and a terminal member 101 extended to the terminal end of the connector 100. In an embodiment of the present disclosure, the connector 100 of the connector plug 1 is a connector with universal specification, such as USB Type-C specification, and is a female end of the specification. The terminal member 101 comprises a cable 102 electrically connected to the connector 100 of the connector plug 1 and a sheath portion 103 enclosing the cable 102. The electrical connection mechanism of the present disclosure is constructed by providing the connector plug 1 at one end of the cable 102, with the cable 102 electrically connected to the connection body 10. Depending on product needs, either connectors (not shown) with identical or different specifications are disposed at the other end of the cable 102, or the other end of the cable 102 is directly connected to a required apparatus (not shown).

The outer casing member 11 comprises an inner casing 110 and an outer casing 111 enclosing the inner casing 110. The inner casing 110 fits to the sheath portion 103 of the connection body 10 from outside. The front end of the inner casing 110 has an insertion port 112 protruding from the front end of the outer casing 111. The insertion port 112 is an opening formed by a circular sidewall of the inner casing 110. The connector 100 of the connector plug 1 protrudes from the front end of the sheath portion 103 to thereby reach the interior of the insertion port 112.

Figure 3:
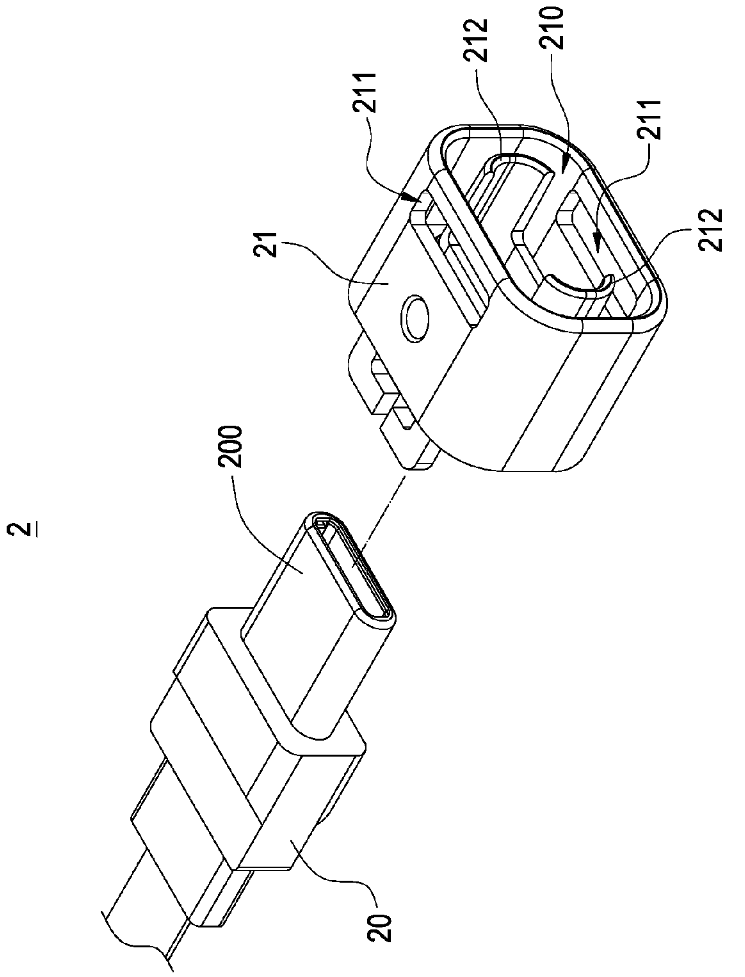
FIG. 3 is an exploded view of the receptacle of the present disclosure.

Referring to FIG. 1 and FIG. 3, the receptacle 2 comprises an abutting body 20 and an abutting outer casing 21. The abutting body 20 has a connector 200 with universal specification, such as Type-C specification or the like. The connector 200 enables the connector plug 1 to achieve electrical connection. The abutting outer casing 21 has an insertion opening 210. The abutting body 20 is adapted to enter the insertion opening 210 smoothly in a way facilitated by the outline of the anterior sidewall of the inner casing 110 of the connector plug 1, so as to achieve the electrical connection of the connector 200 of the receptacle 2 and the connector 100 of the connector plug 1.

Figure 4:
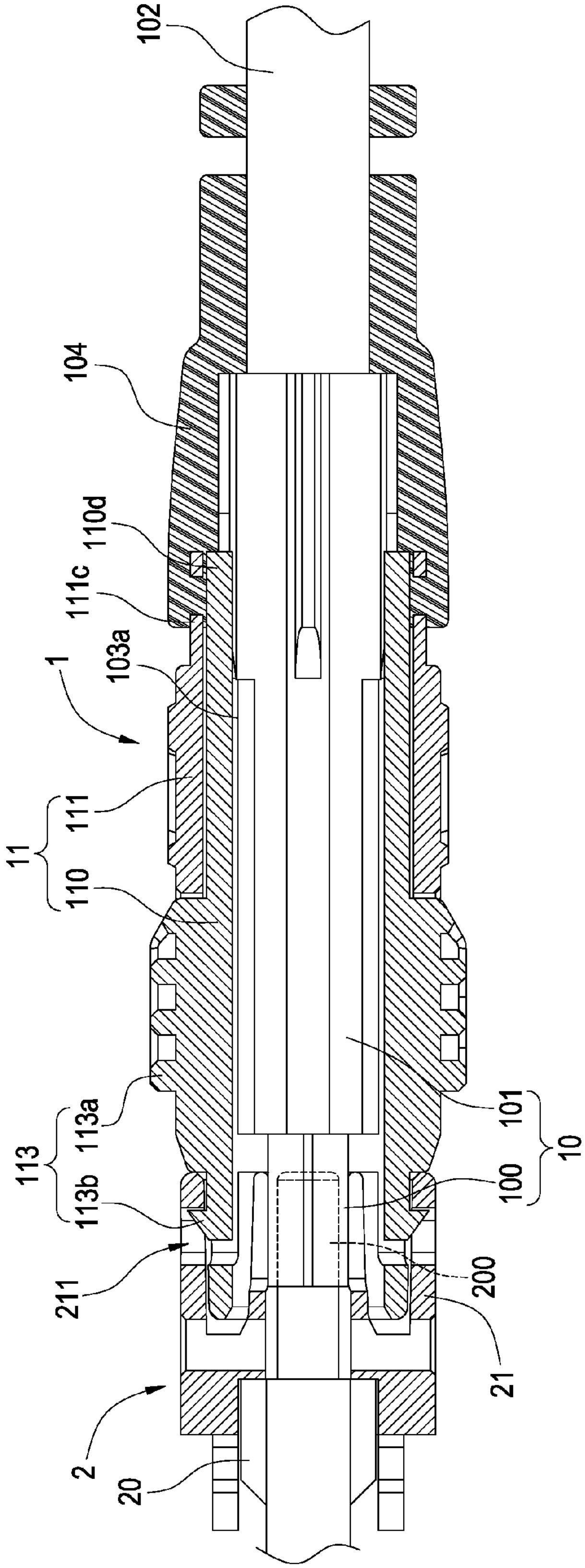
FIG. 4 is a cross-sectional view of the receptacle and the plug plugged thereinto according to the present disclosure.

As shown in FIG. 1 and FIG. 4, the present disclosure is advantageous in that at least one engaging arm 113 is disposed on the inner casing 110 of the connector plug 1. The engaging arm 113 has a pressing portion 113*a* protruding upward from the outer casing 111 and an engaging portion 113*b* extending forward from the pressing portion 113*a* and hanging above the sidewall of the insertion port 112. At least one engaging hole 211 is disposed on the abutting outer casing 21 of the receptacle 2 and corresponds in position to the engaging portion 113*b* of the engaging arm 113; thus, the engaging portion 113*b* becomes engaged with the engaging hole 211 as the connector 100 of the connector plug 1 is inserted into the connector 200 of the receptacle 2. As shown in FIG. 2, a groove is defined on the sidewall of the insertion port 112 and adapted to hang the engaging portion 113*b*. The groove is of a length which can be increased according to the position of the pressing portion 113*a* and can be designed according to the pressing depth of the pressing portion 113*a*. Referring to FIG. 4, at least one channel 103*a* is arranged on the sheath portion 103 and corresponds in position to the pressing portion 113*a* from below, thereby increasing the room for pressing the pressing portion 113*a* downward. Referring to FIG. 3, two guide portions 212 are disposed in the insertion opening 210 of the abutting outer casing 21 of the receptacle 2 and correspond in position to two sides of the connector 200 of the receptacle 2, respectively, to facilitate the alignment and guidance required for the insertion of the connector 100 of the connector plug 1.

Figure 5:
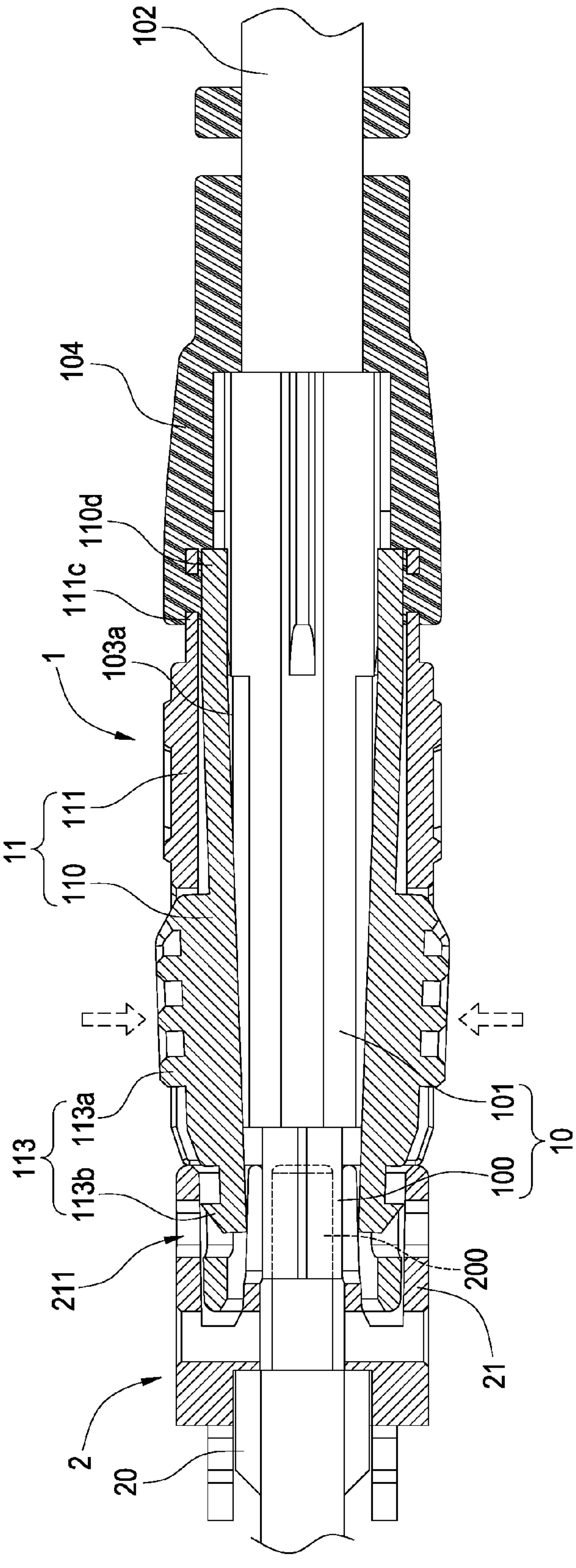
FIG. 5 is a cross-sectional view of the receptacle and plug separated from each other according to the present disclosure.

Referring to FIG. 5, to unplug the connector plug 1 from the receptacle 2, a user presses the pressing portion 113*a* of the engaging arm 113, for example, by hand, to exert a force on the engaging arm 113 and thereby allow the engaging portion 113*b* to bend inward, deform and separate from the engaging hole 211. It is possible to increase the number of the engaging arm 113. As shown in FIG. 2, in an embodiment of the present disclosure, the engaging arms 113 are in the number of two and are disposed on two opposite sidewalls of the insertion port 112, respectively; and, as shown in FIG. 3, the engaging holes 211 are also in the number of two and are disposed at corresponding positions, respectively.

Referring to FIG. 2, in an embodiment of the present disclosure, to couple the inner casing 110 and the outer casing 111 of the connector plug 1 together, the inner casing 110 is inserted into the front end of the outer casing 111, whereas the front edge of the outer casing 111 dents to form a notch 111*a* corresponding in position to the pressing portion 113*a* of the engaging arm 113, such that the pressing portion 113*a* becomes received in the notch 111*a* as the inner casing 110 is inserted into the front end of the outer casing 111. An engaging aperture 111*b* is defined at each of the two ends of the front edge of the outer casing 111 and corresponds in position to a bump 110*c* disposed at the inner casing 110. Upon insertion of the inner casing 110 into the front end of the outer casing 111, the bumps 110*c* engagingly enter the engaging apertures 111*b*, respectively, such that the inner casing 110 and the outer casing 111 are coupled together more firmly.

Referring to FIG. 1 and FIG. 2, in addition to the aforesaid technical features of the electrical connection mechanism of the present disclosure, the cable 102 has a buffer structure 104 located at the terminal end of the outer casing member 11 of the connector plug 1; the buffer structure 104 is made by plastic injection molding and disposed between the cable 102 and the terminal end of the sheath portion 103; an inner link ring 110*d* is disposed at the terminal end of the inner casing 110; an outer link ring 111*c* is disposed at the terminal end of the outer casing 111; after the inner casing 110 and the outer casing 111 have been coupled together, the outer link ring 111*c* is fitted to the inner link ring 110*d*, allowing the outer link ring 111*c* to be coupled to the front edge of the buffer structure 104.

Therefore, given the aforesaid technical features, it is feasible to implement the connector plug, abutting structure of the same, and electrical connection mechanism having the same according to the present disclosure.

In conclusion, the present disclosure achieves anticipated objectives of use and overcomes drawbacks of prior art. Furthermore, the present disclosure has novelty and inventiveness and thus meets patentability requirements. Therefore, a patent application is filed according to the Patent Act, and granting the application with patent rights is respectfully requested to ensure rights of the Inventor.

The present disclosure is disclosed above by preferred embodiments. However, persons skilled in the art should understand that the preferred embodiments are illustrative of the present disclosure only, but shall not be interpreted as restrictive of the scope of the present disclosure. Hence, all equivalent changes made to the aforesaid embodiments shall fall within the scope of the present disclosure. Accordingly, the legal protection for the present disclosure shall be defined by the appended claims.

What is claimed is:

1. A connector plug, comprising:

a connection body having a connector and a terminal member extending to a terminal end of the connector, and the terminal member comprising a cable electrically connected to the connector and a sheath portion enclosing the cable; and an outer casing member comprising an inner casing and an outer casing enclosing the inner casing, the inner casing fitting to the sheath portion from outside, wherein a circular sidewall at a front end of the inner casing defines an insertion port, the insertion port protrudes from a front end of the outer casing when the connector protrudes from a front end of the sheath portion and reaches an interior of the insertion port, and the sheath portion has thereon at least one slot, such that the inner casing is engaged with the at least one slot and thereby fitted to the sheath portion from the outside, wherein at least one engaging arm is disposed on the inner casing and has a pressing portion protruding from the outer casing and an engaging portion extending forward from the pressing portion and hanging above a sidewall of the insertion port.

2. The connector plug of claim 1, wherein the connector complies with Type-C specification.

3. The connector plug of claim 1, wherein a front edge of the outer casing dents to form a notch for receiving the pressing portion.

4. The connector plug of claim 1, wherein the at least one engaging arm is two engaging arms disposed on two opposite sidewalls of the insertion port, respectively.

5. The connector plug of claim 1, wherein the sidewall of the insertion port has a groove at which the engaging portion hangs.

6. An abutting structure of a connector plug, comprising:

a plug comprising a connection body and an outer casing member disposed outside the connection body, the connection body having a terminal member comprising a sheath portion enclosing a cable, the outer casing member comprising an inner casing and an outer casing enclosing the inner casing, wherein a circular sidewall at a front end of the inner casing defines an insertion port, at least one engaging arm is disposed on the inner casing and has a pressing portion protruding from the outer casing and an engaging portion protruding forward from the pressing portion and hanging above a sidewall of the insertion port, and the sheath portion has thereon at least one slot, such that the inner casing is engaged with the at least one slot and thereby fitted to the sheath portion from outside; and a receptacle comprising an abutting body and an abutting outer casing, the abutting outer casing having an insertion opening, wherein the circular sidewall of the inner casing is inserted into the insertion opening, the abutting body reaches an interior of the insertion opening, and the abutting outer casing has at least one engaging hole, wherein the engaging portion becomes engaged with the at least one engaging hole as the connection body is inserted into the abutting body.

7. The abutting structure of a connector plug according to claim 6, wherein the plug and the receptacle each have a connector which complies with Type-C specification.

8. The abutting structure of a connector plug according to claim 6, wherein two guide portions are disposed in the insertion opening of the abutting outer casing and correspond in position to two sides of a connector of the plug, respectively.

9. The abutting structure of a connector plug according to claim 6, wherein a front edge of the outer casing dents to form a notch for receiving the pressing portion.

10. The abutting structure of a connector plug according to claim 6, wherein the at least one engaging arm is two engaging arms disposed on two opposite sidewalls of the insertion port, respectively.

11. The abutting structure of a connector plug according to claim 6, wherein the sidewall of the insertion port has a groove at which the engaging portion hangs.

12. The abutting structure of a connector plug according to claim 6, wherein the connection body has a connector, and the terminal member extends to a terminal end of the connector.

13. The abutting structure of a connector plug according to claim 12, wherein the cable is electrically connected to the connector.

14. The abutting structure of a connector plug according to claim 12, wherein the insertion port protrudes from a front end of the outer casing when the connector protrudes from a front end of the sheath portion and reaches an interior of the insertion port.

15. An electrical connection mechanism having a connector plug, comprising:

a cable; and a plug disposed at an end of the cable and comprising a connection body electrically connected to the cable and an outer casing member disposed outside the connection body, the outer casing member comprising an inner casing and an outer casing enclosing the inner casing, wherein a circular sidewall at a front end of the inner casing defines an insertion port, the connection body has a connector and a terminal member extending to a terminal end of the connector, the terminal member comprises the cable and a sheath portion enclosing the cable, and the sheath portion has thereon at least one slot, such that the inner casing is engaged with the at least one slot and thereby fitted to the sheath portion from outside, wherein at least one engaging arm is disposed on the inner casing and has a pressing portion protruding from the outer casing and an engaging portion extending forward from the pressing portion and hanging above a sidewall of the insertion port.

16. The electrical connection mechanism having a connector plug according to claim 15, wherein the cable has a buffer structure located at a terminal end of the outer casing member.

17. The electrical connection mechanism having a connector plug according to claim 15, wherein the connector complies with Type-C specification.

18. The electrical connection mechanism having a connector plug according to claim 15, wherein a front edge of the outer casing dents to form a notch for receiving the pressing portion.

19. The electrical connection mechanism having a connector plug according to claim 15, wherein the at least one engaging arm is two engaging arms disposed on two opposite sidewalls of the insertion port, respectively.

20. The electrical connection mechanism having a connector plug according to claim 15, wherein the sidewall of the insertion port has a groove at which the engaging portion hangs.

* * * * *